United States Patent
Perla et al.

(10) Patent No.: US 10,690,245 B2
(45) Date of Patent: Jun. 23, 2020

(54) METHOD AND SYSTEM FOR CONTROLLING A CONTINUOUSLY VARIABLE TRANSMISSION FOR A VEHICLE PROPULSION SYSTEM

(71) Applicant: GM GLOBAL TECHNOLOGY OPERATIONS LLC, Detroit, MI (US)

(72) Inventors: Hari C Perla, Novi, MI (US); Joseph W Tatangelo, Wolverine Lake, MI (US); Paul G Otanez, Franklin, MI (US); Alexander J Severt, Ann Arbor, MI (US); Virinchi Mallela, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 250 days.

(21) Appl. No.: 15/807,889

(22) Filed: Nov. 9, 2017

(65) Prior Publication Data

US 2019/0136971 A1    May 9, 2019

(51) Int. Cl.
| | | |
|---|---|---|
| *F16H 61/02* | (2006.01) | |
| *F16H 61/662* | (2006.01) | |
| *F16H 61/12* | (2010.01) | |
| *F16H 59/14* | (2006.01) | |
| *F16H 59/70* | (2006.01) | |

(52) U.S. Cl.
CPC ..... *F16H 61/6625* (2013.01); *F16H 61/0213* (2013.01); *F16H 61/12* (2013.01); *F16H 61/662* (2013.01); *F16H 59/14* (2013.01); *F16H 59/70* (2013.01); *F16H 2059/147* (2013.01); *F16H 2059/704* (2013.01)

(58) Field of Classification Search
CPC ............ F16H 61/6625; F16H 61/12; F16H 2059/704; F16H 2059/147; F16H 59/70; F16H 59/14; F16H 61/662; F16H 61/2013
See application file for complete search history.

(56) References Cited

U.S. PATENT DOCUMENTS

| | | | |
|---|---|---|---|
| 9,765,884 B2 | 9/2017 | Zhang et al. | |
| 2011/0269583 A1* | 11/2011 | Kawakami | F16H 61/0031 474/28 |
| 2015/0204441 A1* | 7/2015 | Kinoshita | F16H 61/66259 701/62 |
| 2016/0258531 A1* | 9/2016 | Ito | F16H 9/18 |
| 2017/0130836 A1 | 5/2017 | Tatangelo et al. | |
| 2017/0138472 A1 | 5/2017 | Tatangelo et al. | |
| 2017/0175886 A1 | 6/2017 | Olson et al. | |
| 2018/0211454 A1* | 7/2018 | Carlson | B60W 50/0205 |
| 2018/0244284 A1* | 8/2018 | Amano | B60W 10/04 |
| 2018/0297485 A1* | 10/2018 | David | B60W 10/18 |
| 2019/0024791 A1* | 1/2019 | Waku | F16H 61/02 |
| 2019/0120373 A1* | 4/2019 | Lee | F16H 61/662 |

* cited by examiner

*Primary Examiner* — David J Hlavka

(57) ABSTRACT

A control system and method for controlling a continuously variable transmission in a vehicle propulsion system includes measuring a speed ratio of the continuously variable transmission, determining whether the measured speed ratio is drifting away from a commanded speed ratio, and adjusting the commanded speed ratio to a value that is different than a desired speed ratio if the measured speed ratio is drifting away from the commanded speed ratio.

9 Claims, 5 Drawing Sheets

METHOD AND SYSTEM FOR CONTROLLING A CONTINUOUSLY VARIABLE TRANSMISSION FOR A VEHICLE PROPULSION SYSTEM

FIELD

The present disclosure relates to a method and system for controlling a continuously variable transmission for a vehicle propulsion system.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

A continuously variable transmission (CVT) is a type of power transmission that is capable of achieving infinite variability within a calibrated range of speed ratios. Unlike conventionally-geared transmissions that use one or more planetary gear sets and multiple rotating and braking friction clutches to establish a discrete gear state, a CVT uses a variable-diameter pulley system. The pulley system, which is commonly referred to as a variator assembly, can transition anywhere within a calibrated range of speed ratios.

A typical variator assembly includes two variator pulleys interconnected via an endless rotatable drive element, such as a drive chain or belt. The endless rotatable drive element rides within a variable-width gap defined by conical pulley faces. One of the variator pulleys receives engine torque via a crankshaft, torque converter, and input gear set, and thus acts as a driving/primary pulley. The other pulley is connected via additional gear sets to an output shaft of the CVT and thus acts as a driven/secondary pulley. One or more planetary gear sets may be used on the input or output sides of the variator assembly depending on the configuration.

In order to vary a CVT speed ratio, a clamping force is applied to the variator pulleys via one or more pulley actuators. The clamping force effectively squeezes the pulley halves together to change the width of the gap between pulley faces. Variation of the gap size, i.e., the pitch radius, causes the rotatable drive element to ride higher or lower within the gap. This in turn changes the effective diameters of the variator pulleys and varies the speed ratio of the CVT. The clamping forces for the variator pulleys are provided using hydraulic actuators and the clamping force generated by those hydraulic actuators depends upon the hydraulic pressure of fluid provided to the actuators. Thus, the pressure of the fluid supplied to each actuator is relied upon to control the speed ratio of the CVT.

It is understood that in order to maintain a speed ratio sufficient hydraulic pressures must be provided to each pulley. These pressure may differ and each pulley may require a different pressure to maintain a certain speed ratio. However, under certain conditions, such as, for example, cold temperatures, wheel slip, engine misfire, a reduction in power available to pump the hydraulic fluid, and/or a pressure capacity of a variator pulley may be lower than may be required to maintain a speed ratio. These conditions may adversely impact the ability of the CVT to maintain a desired and/or commanded speed ratio. As a result, the speed ratio may drift higher or lower than intended. This may result in a loss of propulsion, reduced launch performance, reduced capacity of the CVT to transfer torque, chain or belt slip, reduced durability, reliability, fuel economy, efficiency, performance and/or the like.

SUMMARY

In an exemplary aspect, a method for controlling a continuously variable transmission in a vehicle propulsion system includes measuring a speed ratio of the continuously variable transmission, determining whether the measured speed ratio is drifting away from a commanded speed ratio, and adjusting the commanded speed ratio to a value that is different than a desired speed ratio if the measured speed ratio is drifting away from the commanded speed ratio.

Setting the commanded speed ratio to a value other than a desired speed ratio in a ratio drift situation may enable speed ratio control and an opportunity to return to a condition in which ratio drift may no longer be a potential problem. In this manner, any further speed ratio drift may be reduced and/or eliminated which may improve launch performance, improve torque capacity, improve drivability and control, and improve reliability, durability, fuel economy, efficiency, performance and the like.

In another exemplary aspect, adjusting the commanded speed ratio to a value that is different than a desired speed ratio if the measured speed ratio is drifting away from the commanded speed ratio includes setting the commanded speed ratio to the measured speed ratio.

In another exemplary aspect, adjusting the commanded speed ratio to a value that is different than a desired speed ratio if the measured speed ratio is drifting away from the commanded speed ratio includes a commanded speed ratio that is higher than the desired speed ratio if the measured speed ratio is drifting upward.

In another exemplary aspect, adjusting the commanded speed ratio to a value that is different than a desired speed ratio if the measured speed ratio is drifting away from the commanded speed ratio includes a commanded speed ratio that is lower than the desired speed ratio if the measured speed ratio is drifting downward.

In another exemplary aspect, determining whether the measured speed ratio is drifting away from a commanded speed ratio includes determining whether a difference between a measured speed ratio and a commanded speed ratio exceeds a predetermined threshold.

In another exemplary aspect, determining whether the measured speed ratio is drifting away from a commanded speed ratio includes determining whether a pulley pressure is limited or an error between a commanded pulley pressure and a measured pulley pressure exceeds a predetermined threshold.

In another exemplary aspect, determining whether the measured speed ratio is drifting away from a commanded speed ratio includes determining whether the torque capacity of the continuously variable transmission is higher than a commanded torque capacity by a predetermined amount or the engine torque is at a maximum limit.

In another exemplary aspect, the method further includes determining whether a pressure headroom for both of the pulleys in the continuously variable transmission exceeds a predetermined amount, and setting the commanded speed ratio to a constant if the pressure headroom for both of the pulleys in the continuously variable transmission exceeds the predetermined amount.

In another exemplary aspect, the method further includes determining whether a pressure headroom for both of the pulleys in the continuously variable transmission exceeds a predetermined amount, and setting the commanded speed ratio to measured ratio if the pressure headroom for both of the pulleys in the continuously variable transmission exceeds the predetermined amount.

In another exemplary aspect, the method further includes determining whether a desired speed ratio has changed, and setting the commanded speed ratio to a desired speed ratio if the desired speed ratio has changed.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
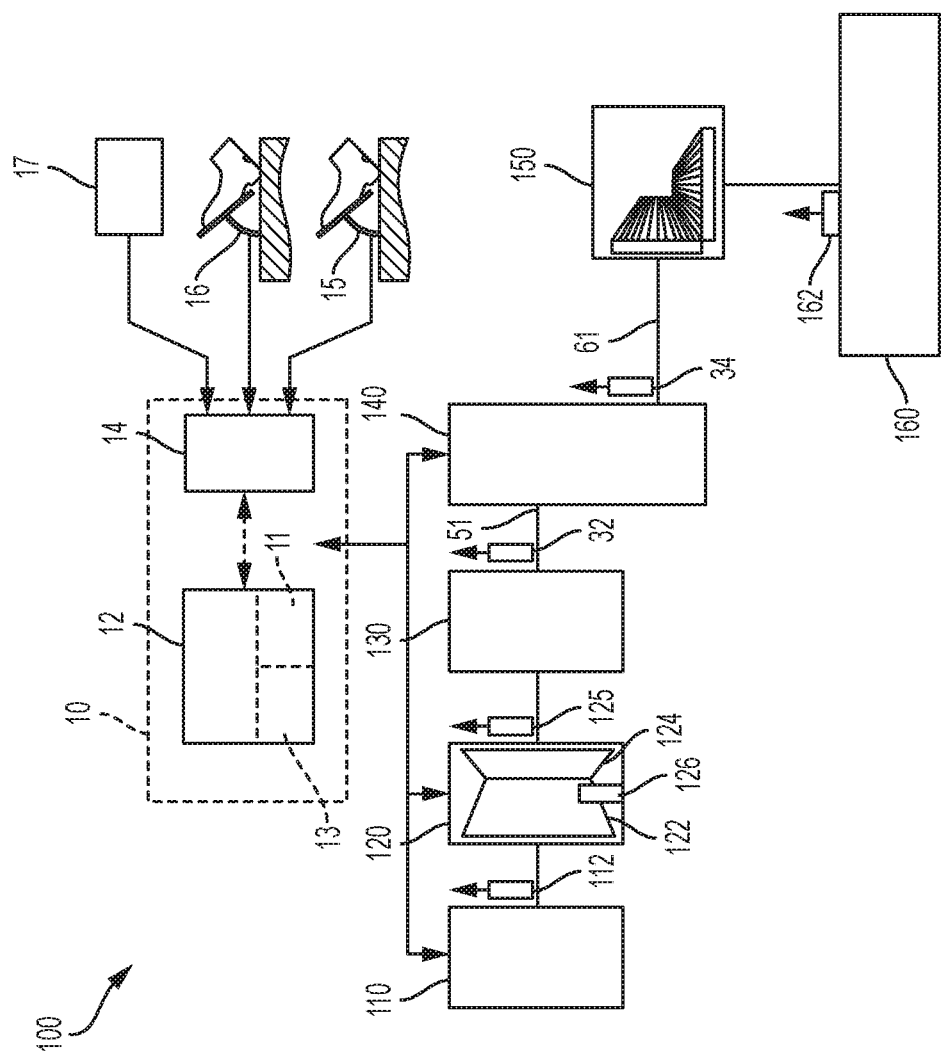
FIG. 1 schematically illustrates a vehicle propulsion system with an internal combustion engine rotatably coupled to a continuously variable transmission (CVT) via a torque converter and a gear box.

Referring now to the drawings, wherein the depictions are for the purpose of illustrating certain exemplary embodiments only and not for the purpose of limiting the same, FIG. 1 schematically illustrates elements of a vehicle propulsion system 100 that includes an internal combustion engine (engine) 110 rotatably coupled to a continuously variable transmission (CVT) 140 via a torque converter 120 and a gear box 130. The vehicle propulsion system 100 couples via a driveline 150 to a vehicle wheel 160 to provide tractive effort when employed on a vehicle. Operation of the vehicle propulsion system 100 is monitored by and controlled by a control system 10 in response to driver commands and other factors.

The engine 110 may be any suitable internal combustion engine capable of transforming hydrocarbon fuel to mechanical power to generate torque in response to commands originating from the control system 10. The torque converter 120 is a device providing a fluid coupling between its input and output members for transferring torque, and preferably includes a pump 122 that is coupled to the engine 110, a turbine 124 that is coupled via the output member to the gear box 130 and a torque converter clutch 126 that locks rotation of the pump 122 and turbine 124 and is controllable by the control system 10. The output member of the torque converter 120 rotatably couples to the gear box 130, which includes meshed gears or other suitable gearing mechanisms that provide reduction gearing between the torque converter 120 and the CVT 140. Alternatively the gear box 130 may be another suitable gear configuration for providing gearing between the engine 110, the torque converter 120 and the CVT 140, including, by way of non-limiting examples, a chain drive gear configuration or a planetary gear configuration. In alternative embodiments, either or both the torque converter 120 and the gear box 130 may be omitted.

The gear box 130 includes an output member that rotatably couples to the CVT 140 via an input member 51. An exemplary embodiment of the CVT 140 is described with reference to FIG. 2. An output member 61 of the CVT 140 rotatably couples to the driveline 150, which rotatably couples to the vehicle wheels 160 via an axle, half-shaft or another suitable torque transfer element. The driveline 150 may include a differential gearset, a chain drive gearset or another suitable gear arrangement for transferring torque to one or more vehicle wheels 160.

The vehicle propulsion system 100 preferably includes one or more sensing devices for monitoring rotational speeds of various devices, including, e.g., an engine speed sensor 112, a torque converter turbine speed sensor 125, a CVT variator input speed sensor 32, a CVT variator output speed sensor 34, and a wheel speed sensor 162, through which vehicle speed is monitored. Each of the aforementioned speed sensors may be any suitable rotation position/speed sensing device, such as a Hall-effect sensor. Each of the aforementioned speed sensors communicates with the control system 10.

The control system 10 preferably includes a controller 12 and a user interface 14. The controller 12 may communicate with a plurality of controller devices, wherein each device is associated with monitoring and controlling a single system. This may include an engine control module (ECM) for controlling the engine 110, and a transmission controller (TCM) for controlling the CVT 140 and monitoring and controlling a single subsystem, e.g., the torque converter clutch 126. The controller 12 preferably includes a non-volatile memory device 11 containing executable instruction sets and a memory cache 13. The user interface 14 communicates with operator input devices including, e.g., an accelerator pedal 15, a brake pedal 16 and a transmission gear selector 17 to determine an output torque request. In certain embodiments, the transmission gear selector 17 includes a tap-up/tap-down feature, whereby a vehicle operator may manually select a transmission gear ratio and override automatic control of a speed ratio of the CVT 140. A tap-up command results in a command to the CVT 140 to decrease its gear ratio, which is accomplished by increasing a variator speed ratio. A tap-down command results in a command to the CVT 140 to increase its gear ratio by decreasing the variator speed ratio.

Figure 2:
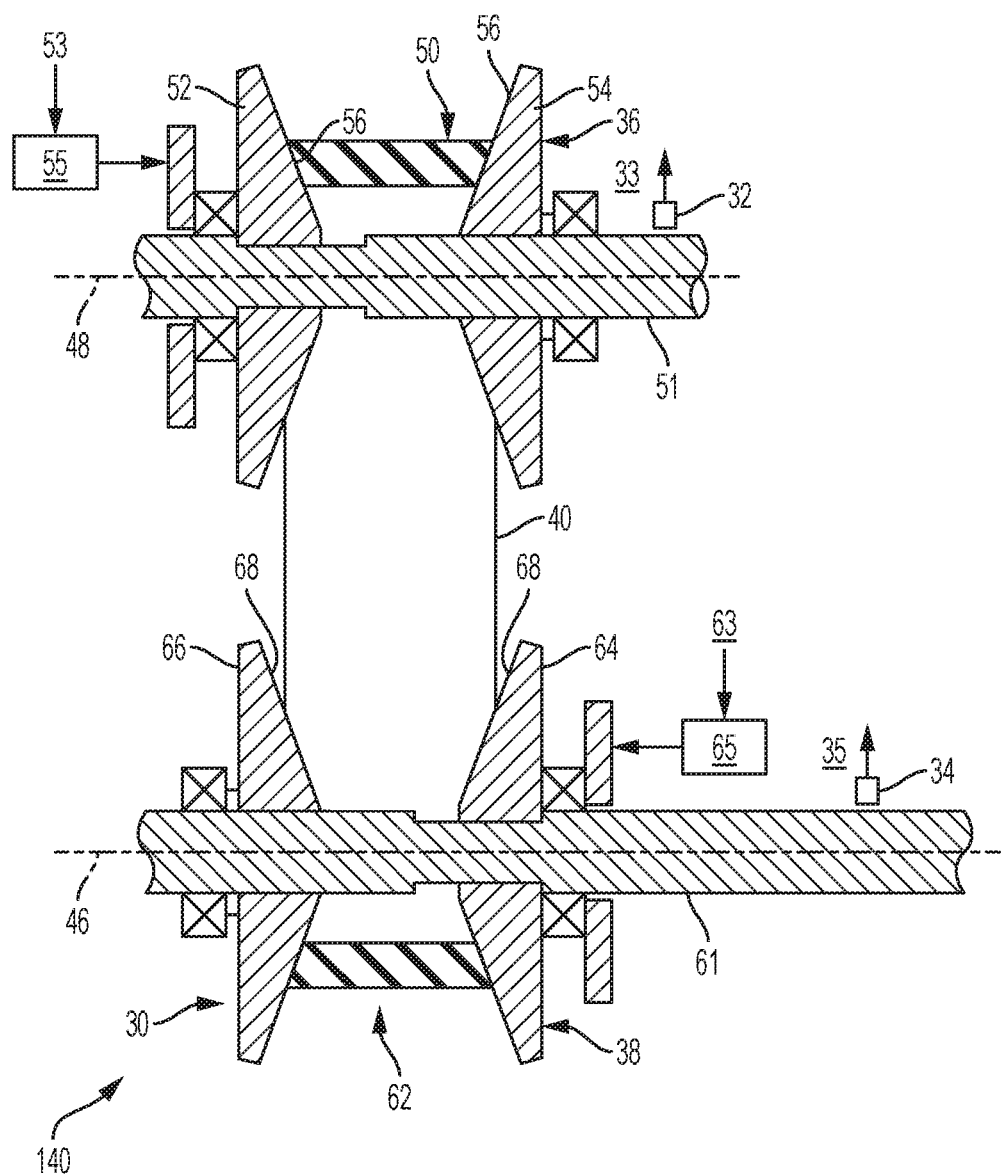
FIG. 2 is a schematic cross-section of a variator of a chain-type CVT.

FIG. 2 schematically illustrates elements of a variator 30 of an exemplary embodiment of the CVT 140 that may be advantageously controlled by the TCM. The variator 30 transfers torque between the first rotating member 51 and the second rotating member 61. The first rotating member 51 may be referred to as an input member 51, and the second rotating member 61 may be referred to as an output member 61.

The variator 30 includes a first, or primary pulley 36, a second, or secondary pulley 38 and a flexible continuous rotatable device 40 that rotatably couples the first and second pulleys 36, 38 to transfer torque. The first pulley 36 rotatably attaches to the input member 51 and the second pulley 38 rotatably attaches to the output member 61, and the rotatable device 40 is adapted to transfer torque between the first and second pulleys 36, 38 and thus between the input and output members 51, 61. The first pulley 36 and input member 51 rotate about a first axis 48, and the second pulley 38 and output member 61 rotate about a second axis 46. The continuous rotatable device 40 can be a belt, a chain, or another suitable flexible continuous device. The input speed sensor 32 may be mounted near the input member 51 to generate a CVT input speed 33 that relates to a speed of the first, input pulley 36, and the output speed sensor 34 may be mounted near the output member 61 to generate a CVT output speed 35 that relates to a speed of the second, output pulley 38. One of the first and second pulleys 36, 38 acts as a ratioing pulley to establish a speed ratio and the other of the first and second pulleys 36, 38 acts as a clamping pulley to generate sufficient clamping force to transfer torque. As used herein, the term 'speed ratio' refers to a variator speed ratio, which is a ratio of the speed of the output member 61 in relation to the speed of the input member 51. The speed of the input member 51 may be determined based upon a signal input from one of the engine speed sensor 112, the torque converter turbine speed sensor 125, or the input speed sensor 32, as described herein, or another suitable speed/position sensor. The speed of the output member 61 may be determined based upon a signal input from the output speed sensor 34 or the wheel speed sensor 162 as described herein, or another suitable speed/position sensor. Regardless of the measurement system(s) employed, the speed ratio parameters may be based upon the CVT input speed and the CVT output speed. Alternatively, speed ratio may also be based upon the ratio of the running radii on each side or the input torque and the output torque.

The first pulley 36 is split perpendicular to the first axis 48 to define an annular first groove 50 that is formed between a first moveable sheave 52 and a first stationary sheave 54. The first moveable sheave 52 axially moves or translates along the first axis 48 relative to the first stationary sheave 54. For example, the first moveable sheave 52 may be attached to the input member 51 via a splined connection, thereby allowing axial movement of the first moveable sheave 52 along the first axis 48. The first stationary sheave 54 is disposed opposite the first moveable sheave 52. The first stationary sheave 54 is axially fixed to the input member 51 along the first axis 48. As such, the first stationary sheave 54 does not move in the axial direction of the first axis 48. The first moveable sheave 52 and the first stationary sheave 54 each include a first groove surface 56. The first groove surfaces 56 of the first moveable sheave 52 and the first stationary sheave 54 are disposed opposite each other to define the annular first groove 50. The opposed first grooved surfaces 56 preferably form an inverted frustoconical shape such that a movement of the first moveable sheave 52 towards the first stationary sheave 54 increases an outer pulley diameter of the annular first groove 50. A first actuator 55 is arranged with the first pulley 36 to control an axial position of the first moveable sheave 52 in response to a drive signal 53, including urging the first moveable sheave 52 towards the first stationary sheave 54. In certain embodiments, the first actuator 55 is a hydraulically-controlled device and the drive signal 53 is a hydraulic pressure signal. Hydraulic pressure may be monitored by a sensing device in the first actuator 55, or elsewhere in a hydraulic circuit supplying pressurized hydraulic fluid to the first actuator 55.

The second pulley 38 is split perpendicular to the second axis 46 to define an annular second groove 62. The annular second groove 62 is disposed perpendicular to the second axis 46. The second pulley 38 includes a second moveable sheave 64 and a second stationary sheave 66. The second moveable sheave 64 axially moves or translates along the second axis 46 relative to the stationary sheave 66. For example, the second moveable sheave 64 may be attached to the output member 61 via a splined connection, thereby allowing axial movement of the second moveable sheave 64 along the second axis 46. The second stationary sheave 66 is disposed opposite the second moveable sheave 64. The second stationary sheave 66 is axially fixed to the output member 61 along the second axis 46. As such, the second stationary sheave 66 does not move in the axial direction of the second axis 46. The second moveable sheave 64 and the second stationary sheave 66 each include a second groove surface 68. The second groove surfaces 68 of the second moveable sheave 64 and the second stationary sheave 66 are disposed opposite each other to define the annular second groove 62. The opposed second grooved surfaces 68 preferably form an inverted frustoconical shape such that a movement of the second moveable sheave 64 towards the second stationary sheave 66 increases an outer pulley diameter of the annular second groove 62. A second actuator 65 is arranged with the second pulley 38 to control an axial position of the second moveable sheave 64 in response to a driven signal 63, including urging the second moveable sheave 64 towards the second stationary sheave 66. In certain embodiments, the second actuator 65 is a hydraulically-controlled device and the driven signal 63 is a hydraulic pressure signal. Hydraulic pressure may be monitored by a sensing device in the second actuator 65, or elsewhere in a hydraulic circuit supplying pressurized hydraulic fluid to the second actuator 65. A ratio of the outer pulley diameter of the first pulley 36 and the outer pulley diameter of the second pulley 38 defines a transmission torque ratio. Other elements, such as clutch assemblies in the form of selectable one-way clutches and the like may be deployed between the variator 30 and other powertrain and driveline components and systems.

The speed ratio may be described in terms of an actual speed ratio and a desired speed ratio. An actual speed ratio indicates a present, measured value for the speed ratio, and may be determined based upon a ratio of the input speed signal 33 and the output speed signal 35. A desired speed ratio indicates a commanded, future value for the speed ratio, which may be determined based upon monitored and estimated operating conditions related to an output power command, vehicle speed, engine torque, and other factors. The TCM executes control routines to control the CVT 140 to achieve the desired speed ratio by controlling pressures of one or both the primary pulley 36 and the secondary pulley 38 of the CVT 140. Controlling pressures of one or both the primary pulley 36 and the secondary pulley 38 of the CVT 140 can be achieved by controlling the driving and driven signals 53, 63 to apply requisite pressures to the first and second actuators 55, 65 to effect the measured speed ratio. The requisite pressures are preferably in the form of a primary pressure command and a secondary pressure command.

Figure 3:
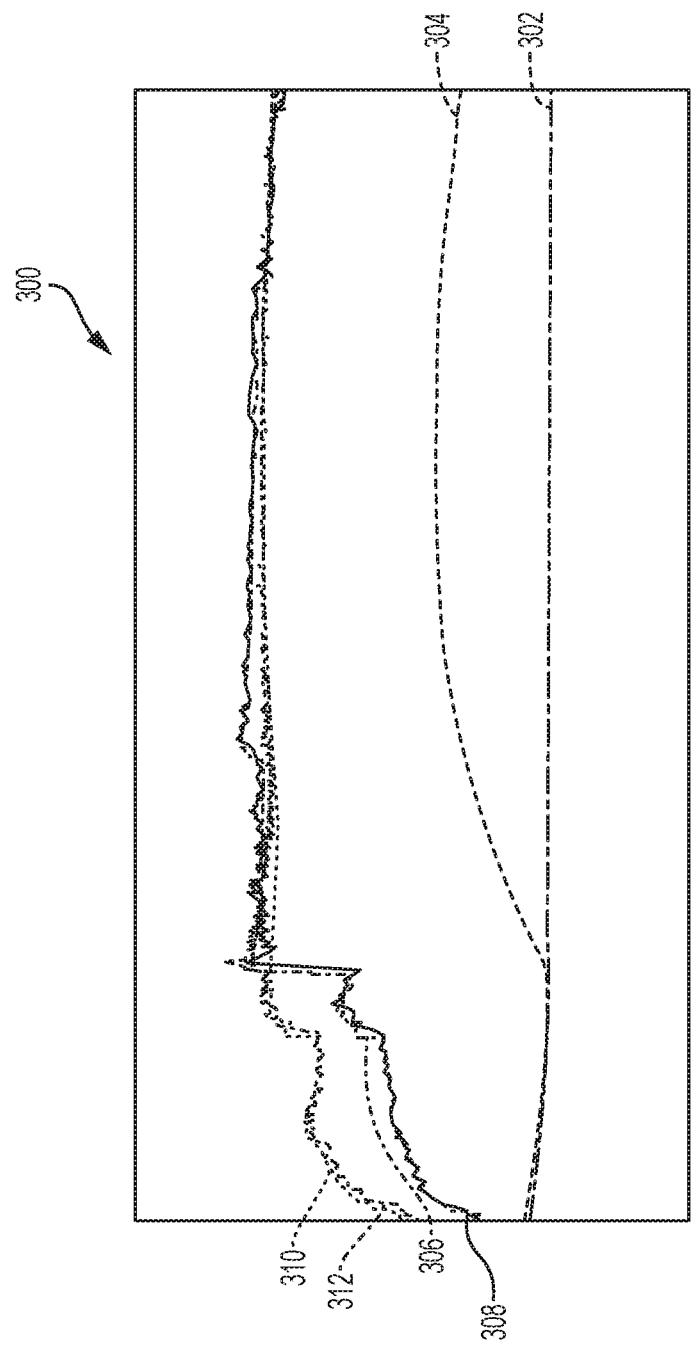
FIG. 3 is a graph of various signals from a CVT experiencing a ratio drift.

As explained previously, under certain conditions, a CVT may not be able to maintain a desired speed ratio. For example, colder temperatures may require higher clamping forces which increases the demand for hydraulic pressure which may exceed that which is available to be shared between the variator pulleys. In general, under various conditions, a variator pulley may have a pressure capacity which is lower than required to achieve and/or maintain a speed ratio. Referring now to FIG. 3, a graph 300 of various sensor signals from a CVT experiencing undesirable ratio drift is illustrated. FIG. 3 shows a commanded speed ratio signal 302 and a measured speed ratio signal 304 where the measured speed ratio signal 304 initially follows the commanded speed ratio signal 302, but starts to drift away. In this instance, the measured speed ratio signal 304 drifts higher than the commanded speed ratio signal 302, however, it is to be understood that the measured speed ratio signal 304 may also drift lower than the commanded speed ratio signal 302. The present disclosure is applicable to either situation without limitation.

The graph 300 of FIG. 3 also includes a primary pulley commanded pressure signal 306, a primary pulley measured pressure signal 308, a secondary pulley commanded pressure signal 310, and a secondary pulley measured pressure signal 312. In general, each of the measured pressure signals 308 and 312 follow their respective commanded pressure signals 306 and 310 closely, respectively. The primary pulley pressure signals 306 and 308 both make a jump upward. This is likely due to the step in clamp torque and primary pulley acting as the clamping pulley and the secondary pulley acting as a ratioing pulley and there may be an increase in the amount of secondary pulley pressure which is required to prevent the speed ratio from increasing, however, the secondary pulley may not have additional capacity to command additional pressure. The secondary pulley pressure may already be at a maximum pressure for the secondary pulley. The control system requests (commands) an increase in primary pulley pressure in an attempt to not let the variator slip. Since the primary pulley is acting as a clamping pulley, it may not be capable of having the desired effect on speed ratio. The result is that the measured speed ratio 304 starts to drift away from the commanded speed ratio 302. A conventional CVT control system will continue to try to reduce the "error" between the commanded speed ratio 302 and the measured speed ratio 304 by continuing to request/command pulley pressures. However, because the pressure capacity of one or both of the variator pulleys may have been exceeded, the measured pulley pressure(s) are not capable of achieving the desired pressures.

Figure 4:
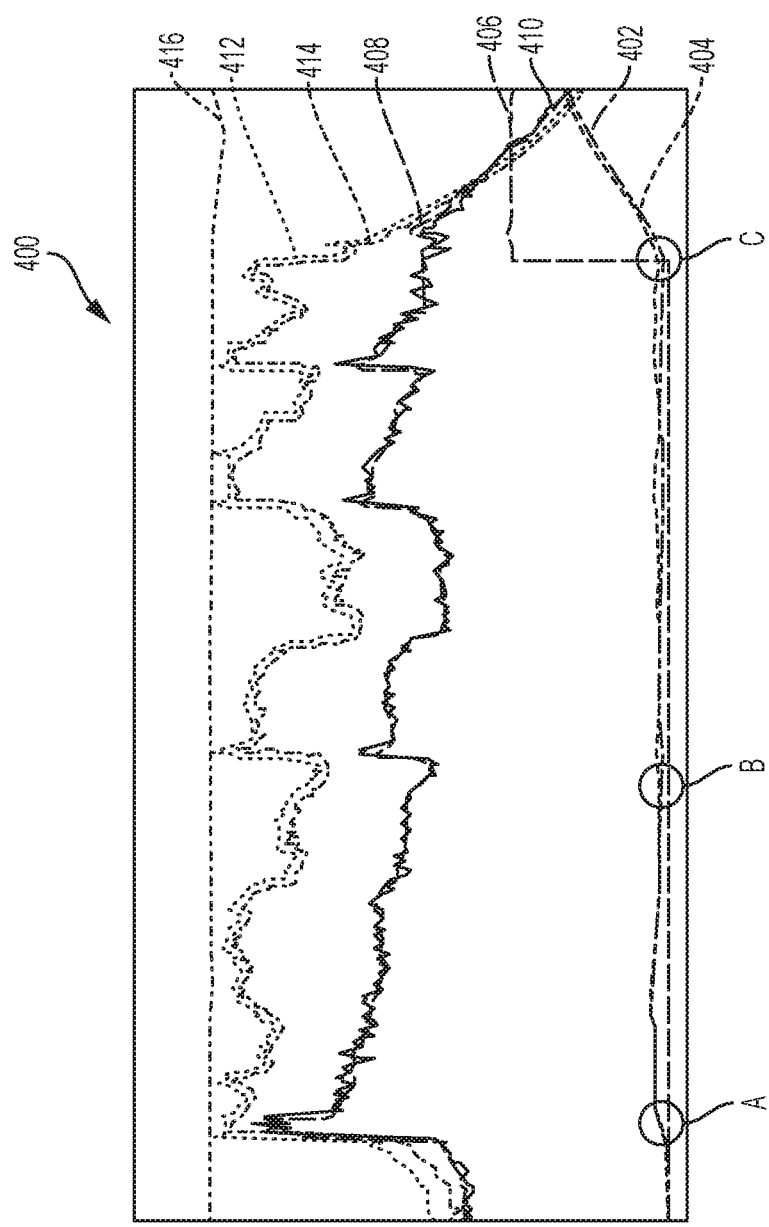
FIG. 4 is a graph illustrating various signals from an exemplary control system and method in accordance with the present disclosure.

Referring now to FIG. 4, graph 400 illustrates various signals from an exemplary control system and method in accordance with the present disclosure which operates to reduce and/or eliminate speed ratio drift in a CVT. Similar to FIG. 3, FIG. 4 includes a commanded speed ratio signal 402 and a measured speed ratio signal 404. The graph 400 of FIG. 4 also illustrates a desired speed ratio 406. The desired speed ratio 406 may be based upon multiple conditions and input such as, for example, a driver request for torque. FIG. 4 also includes a commanded primary pulley pressure signal 408, a measured primary pulley pressure signal 410, a commanded secondary pulley pressure signal 412, and a measured secondary pulley pressure signal 414.

Initially, the commanded speed ratio 402 follows the desired speed ratio 406 as may have been conventionally done. There is a step upward increase in both the commanded primary pulley pressure signal 408 and the commanded secondary pulley pressure signal 412, in response, the measured primary pulley pressure 410 follows the commanded primary pulley pressure 408 and the measured secondary pulley pressure 414 follows the commanded secondary pulley pressure 412, respectively. However, FIG. 4 also illustrates the max pressure capacity for the secondary pulley as line 416 and we can note that the commanded secondary pulley pressure 412 bumps into, but is limited to the max pressure capacity for the secondary pulley 416. Therefore, there is a determinable risk that the commanded pulley pressures 408 and 412 may not be sufficient to prevent measured speed ratio 404 drifting away from the commanded speed ratio 402. In response, at "A", the exemplary control system and method of the present disclosure, may set the commanded speed ratio 402 to the measured speed ratio 404 and cause the commanded speed ratio 402 to follow the measured speed ratio 404. This effectively sets any "error" between the commanded speed ratio 402 and the measured speed ratio 404 to zero and eliminates, at least temporarily, any effect a feedback controller may otherwise have on adjusting commanded pulley pressures 408 and 412 in an attempt to minimize and/or eliminate this error.

Subsequently, between "A" and "B", on the graph 400, we can see that the pulley pressures 408, 410, 412, and 414 all tend to gradually decrease and, in particular, the secondary pulley pressures 412 and 414 reduce and increase their distance between the max capacity limit 416. At point "B", the secondary pulley pressures 412 and 414 gain enough of a "headroom" below the maximum pressure capacity limit 416 that the measured speed ratio 404 may be reliably controlled to closely follow the commanded speed ratio 402. In an exemplary embodiment, the control system and method may determine that the difference between the secondary pulley pressures 412 and/or 414 and the secondary pulley maximum pressure limit 416 exceeds a predetermined threshold. In response to that determination, the exemplary control system and method may then set the commanded speed ratio 402 to a constant value, which may optionally correspond to the measured speed ratio 404 at point "B", and the system and method may then operate to control the CVT such that the measured speed ratio 404 follows the constant, commanded speed ratio 402.

FIG. 4 illustrates that the measured speed ratio 404 continues to be controlled such that is closely follows the constant, commanded speed ratio 402, until point "C". At point "C", another condition may be identified which justifies a return to conventional control methods and systems. For example, in the instance illustrated in FIG. 4, the desired speed ratio 406 increases from a value below the commanded speed ratio 402 to a value which is above the commanded speed ratio 402. In this situation, we know that an increase in speed ratio corresponds to a reduced requirement for pulley pressures to maintain the speed ratio. Therefore, we may have confidence that the risk of any potential speed ratio drift may be substantially eliminated and/or reduced. Thus, in this exemplary embodiment of the control system and method, the commanded speed ratio 402 may then be conventionally controlled such that it follows the desired speed ratio 406.

In general, multiple different exit conditions may be identified and relied upon to either immediately, or gradually exit the exemplary control system and method and return to a conventional control system and method without limitation. Additional alternative, and exemplary exit conditions will be further discussed but it is to be understood that the present invention is not limited to any specific exit condition.

Figure 5:
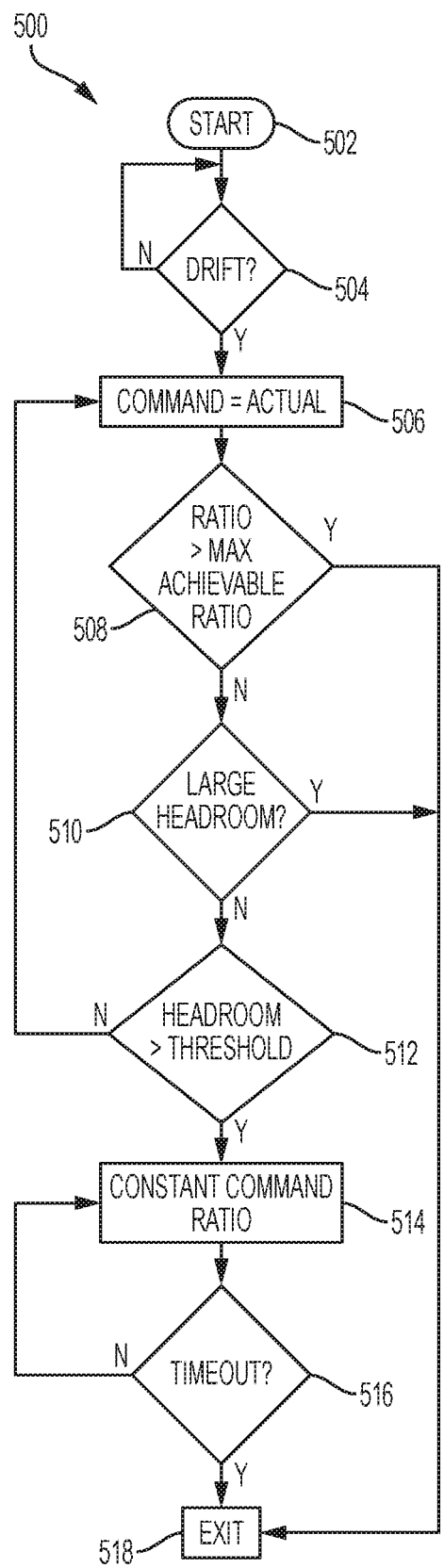
FIG. 5 is a flowchart illustrating an exemplary method in accordance with the present disclosure.

FIG. 5 illustrates a flowchart 500 of an exemplary method in accordance with the present disclosure. The method starts at step 502 and continues to step 504. In step 504, a controller determines whether the actual speed ratio is drifting away from the commanded speed ratio. For example, the controller may determine whether the measured speed ratio is drifting from the commanded speed ratio by determining: 1) whether the actual/measured speed ratio differs from the commanded speed ratio by an amount that exceeds a predetermined threshold amount; 2) the pressure of at least one of the pulleys is being limited or that there is a sufficient error between a commanded pulley pressure and a measured pulley pressure; and/or 3) the actual torque capacity of the CVT is higher than the commanded torque capacity by a predetermined threshold amount or that the engine torque is at a maximum amount. In an exemplary embodiment, the controller determines that the speed ratio is drifting if all of the above three conditions are satisfied. If, in step 504, the controller determines that the measure speed ratio is drifting away from the commanded speed ratio, then the method continues to step 506. In step 506, the controller sets the commanded speed ratio to match the measured speed ratio. Preferably, the controller sets the commanded speed ratio to follow the measured speed ratio. In this manner, the pressure adjustments to the CVT that would have occurred to reduce the error between the commanded and measured speed ratio are inactive and the overall system tends to settle down, the pressures may gradually reduce on their own, and the ratio drift may be significantly reduced and/or eliminated. The method then continues to step 508.

In step 508, the method determines whether the measured speed ratio exceeds a predetermined maximum drift amount. The controller executes this step to avoid the situation where a more extreme condition may be present and one in which the present disclosure may not be helpful to solve. In this manner, the controller determines whether a condition exists under which the method in accordance with the present disclosure should be exited. In other words, the controller determines whether an exit condition exists. If, in step 508, the controller determines that the measured speed ratio exceeds the predetermined maximum drift amount, then the method jumps to step 518 where the controller exits the method. Alternatively, if in step 508, the controller determines that the measured speed ratio does not exceed the predetermined maximum drift amount, then the method continues to step 510.

In step 510, the method determines whether a large/big amount of headroom exists in the CVT system. In other words, the controller determines whether the pulley pressures both differ from their respective maximum limit pressures by large predetermined threshold amounts. Preferably, these large predetermined threshold amounts correspond to amounts which ensure a high confidence that the pressure headroom for both pulleys are sufficient to reliably control the measured speed ratio such that it closely follows the commanded speed ratio. If, in step 510, the method determines that a large amount of headroom exists in the system, then the system jumps to step 518, where the method exits. Alternatively, if, in step 510, the method determines that a large amount of headroom does not exist in the system, then the method continues to step 512.

In step 512, the method determines whether the headroom in the system is larger than another predetermined threshold amount, which is smaller than the predetermined threshold amount from step 510. Preferably, the controller determines whether the headroom in the system is larger than the predetermined threshold amount by determining whether the difference in measured pulley pressures are both sufficiently below their respective maximum pressure limits by an amount that exceeds the predetermined threshold amount. This predetermined threshold amount may be selected such that we may be confident that the controller will reliably be able to control the measured speed ratio such that it closely follows the commanded speed ratio. If, in step 512, the method determines whether the headroom in the system is larger than the predetermined threshold amount, then the method continues to step 514, otherwise the method returns to step 506.

In step 514, the method sets the commanded speed ratio to a constant value. In an exemplary embodiment, the controller may set the commanded speed ratio at a value which corresponds to the measured speed ratio when the controller reaches the method step 514. The method then continues to step 516. In step 516, the method determines whether a predetermined period of time has elapsed since the method step 514 was executed. In an exemplary embodiment, the predetermined period of time may ensure that the method of the present disclosure is not applied if the system is faulty bad for some reason which is not being addressed by the method of the present disclosure. If, in step 516, the controller determines that timer has not timed out, then the method returns to step 514. If, however, in step 516, the controller determines that the predetermined period of time has elapsed, then the method continues to step 518 where the method exits.

Optionally, and perhaps preferably, the method may further include a step where the controller determines whether the desired speed ratio has changed and if the controller determines that the desired speed ratio has changed the controller may also exit the method. For example, the controller may determine whether the desired speed ratio exceeds the commanded speed ratio and if the controller determines that the desired speed ratio exceeds the commanded speed ratio, then the controller may then exit the method of the present disclosure. The desired speed ratio may change, for example, when a driver provides an input which indicates a change in desired torque. Alternatively, the controller may continue to execute the method of the present disclosure.

Additionally, it is to be understood that while the method described with reference to FIG. 5 includes specifically identified exit criteria/conditions, that the method of the present disclosure is not limited to any specific exit criteria and/or condition either alone or in any combination. For example, in some CVT systems pressure may be boosted in anticipation of the vehicle coming to stop so that a fast downshift may be executed. In such an instance, it may be desirable to not use/run the method described in the present disclosure. Other conditions may be identifiable, such as, a speed sensor fault, a pulley pressure fault which may optionally be used as a disable reason to not use/run the described method. Further, the thresholds which have been described previously may be determined in accordance with methods which are known to those of ordinary skill in the art, such as by, for example, known calibration techniques and processes.

Further, while the present detailed description described an exemplary condition in which a speed ratio may have been drifting upwardly, it is to be understood that the control system and method of the present disclosure is also applicable to a condition in which the speed ratio may be drifting downwardly. Adjustments to the control system and method to address this other condition will be understood by those of ordinary skill in the art with reference to the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for controlling a continuously variable transmission in a vehicle propulsion system, the method comprising:
   measuring a speed ratio of the continuously variable transmission;
   determining whether the measured speed ratio is drifting away from a commanded speed ratio; and
   adjusting the commanded speed ratio to a value that is different than a desired speed ratio if the measured speed ratio is drifting away from the commanded speed ratio, wherein determining whether the measured speed ratio is drifting away from a commanded speed ratio comprises one of:
   a) determining whether a difference between a measured speed ratio and a commanded speed ratio exceeds a predetermined threshold;
   b) determining whether a pulley pressure is limited or an error between a commanded pulley pressure and a measured pulley pressure exceeds a predetermined threshold; and
   c) determining whether input torque of the continuously variable transmission is higher than a commanded torque capacity by a predetermined amount or the engine torque is at a maximum.

2. The method of claim 1, wherein adjusting the commanded speed ratio to a value that is different than a desired speed ratio if the measured speed ratio is drifting away from the commanded speed ratio comprises setting the commanded speed ratio to the measured speed ratio.

3. The method of claim 1, wherein adjusting the commanded speed ratio to a value that is different than a desired speed ratio if the measured speed ratio is drifting away from the commanded speed ratio comprises a commanded speed ratio that is higher than the desired speed ratio if the measured speed ratio is drifting upward.

4. The method of claim 1, wherein adjusting the commanded speed ratio to a value that is different than a desired speed ratio if the measured speed ratio is drifting away from the commanded speed ratio comprises a commanded speed ratio that is lower than the desired speed ratio if the measured speed ratio is drifting downward.

5. The method of claim 1, further comprising:
   determining whether a pressure headroom for both of the pulleys in the continuously variable transmission exceeds a predetermined amount; and
   setting the commanded speed ratio to a constant if the pressure headroom for both of the pulleys in the continuously variable transmission exceeds the predetermined amount.

6. The method of claim 1, further comprising:
   determining whether a pressure headroom for both of the pulleys in the continuously variable transmission exceeds a predetermined amount; and
   setting the commanded speed ratio to a desired speed ratio if the pressure headroom for both of the pulleys in the continuously variable transmission exceeds the predetermined amount.

7. The method of claim 1, further comprising:
   determining whether a desired speed ratio has changed; and
   setting the commanded speed ratio to the desired speed ratio if the desired speed ratio has changed, wherein the instruction set that determines whether the measured speed ratio is drifting away from a commanded speed ratio comprises one of:
   a) an instruction set that determines whether a difference between a measured speed ratio and a commanded speed ratio exceeds a predetermined threshold;
   b) an instruction set that determines whether a pulley pressure is limited or an error between a commanded pulley pressure and a measured pulley pressure exceeds a predetermined threshold; and
   c) an instruction set that determines whether the input torque of the continuously variable transmission is higher than a commanded torque capacity by a predetermined amount or the engine torque is at a maximum.

8. A controller for a continuously variable transmission in a vehicle propulsion system, the controller including an instruction set, the instruction set executable to:
   measure a speed ratio of the continuously variable transmission;
   determine whether the measured speed ratio is drifting away from a commanded speed ratio; and
   adjust the commanded speed ratio to a value that is different than a desired speed ratio if the measured speed ratio is drifting away from the commanded speed ratio, the instruction set further including instructions executable to:
   determine whether a pressure headroom for both of the pulleys in the continuously variable transmission exceeds a predetermined amount; and
   set the commanded speed ratio to a constant if the pressure headroom for both of the pulleys in the continuously variable transmission exceeds the predetermined amount.

9. A controller for a continuously variable transmission in a vehicle propulsion system, the controller including an instruction set, the instruction set executable to:
   measure a speed ratio of the continuously variable transmission;
   determine whether the measured speed ratio is drifting away from a commanded speed ratio; and
   adjust the commanded speed ratio to a value that is different than a desired speed ratio if the measured speed ratio is drifting away from the commanded speed ratio, the instruction set further including instructions executable to:
   determine whether a pressure headroom for both of the pulleys in the continuously variable transmission exceeds a predetermined amount; and
   set the commanded speed ratio to a desired speed ratio if the pressure headroom for both of the pulleys in the continuously variable transmission exceeds the predetermined amount.

* * * * *